United States Patent [19]

Negrutsky et al.

[11] Patent Number: 4,712,772

[45] Date of Patent: Dec. 15, 1987

[54] POWER HYDRAULIC GEAR

[76] Inventors: Sergei B. Negrutsky, 43, kv. 121, Karaganda, bulvar Mira; Sergei B. Klimov, Sovetsky, 60/2, kv. 14, Karaganda, prospekt; Boris F. Negrutsky, 51, kv. 12, Karaganda, ulitsa Lenina; Vladimir G. Churkin, 14, kv. 12, Karaganda, ulitsa Kostenko, all of U.S.S.R.

[21] Appl. No.: 824,010

[22] PCT Filed: Nov. 2, 1984

[86] PCT No.: PCT/SU84/00056

§ 371 Date: Dec. 19, 1985

§ 102(e) Date: Dec. 19, 1985

[87] PCT Pub. No.: WO85/04933

PCT Pub. Date: Nov. 7, 1985

[30] Foreign Application Priority Data

Apr. 24, 1984 [SU] U.S.S.R. .............................. 3732434

[51] Int. Cl.[4] ........................ B66D 3/18; B25B 25/00; F16H 27/02

[52] U.S. Cl. ...................................... 254/264; 74/128; 74/129; 188/65.1; 254/228; 277/103; 277/113

[58] Field of Search ............... 254/228, 264, 257, 258, 254/259, 199; 24/115 R; 74/128, 129, 160; 188/65.1; 277/102, 103, 113, 114

[56] References Cited

U.S. PATENT DOCUMENTS

| | | | |
|---|---|---|---|
| 3,228,703 | 1/1966 | Wilson | 277/103 X |
| 3,393,917 | 7/1968 | Kendall et al. | 277/103 |
| 4,456,226 | 6/1984 | Stumpmeier | 254/228 X |
| 4,593,884 | 6/1986 | Zschocke et al. | 254/228 X |

FOREIGN PATENT DOCUMENTS

| | | | |
|---|---|---|---|
| 795195 | 9/1968 | Canada | 254/264 |
| 1219199 | 6/1966 | Fed. Rep. of Germany . | |
| 1800025 | 12/1969 | Fed. Rep. of Germany | 254/199 |
| 2040545 | 2/1972 | Fed. Rep. of Germany | 254/199 |
| 2152557 | 4/1973 | France . | |
| 2496074 | 6/1982 | France . | |
| 663400 | 12/1951 | United Kingdom | 254/199 |
| 1186244 | 4/1970 | United Kingdom | 254/264 |
| 993677 | 12/1983 | U.S.S.R. . | |

*Primary Examiner*—John Petrakes
*Assistant Examiner*—Joseph J. Hail, III
*Attorney, Agent, or Firm*—Fleit, Jacobson, Cohn & Price

[57] ABSTRACT

A power hydraulic gear comprising a housing (1) which accommodates a piston (3) through which a traction guide member (7) is passed, and a mechanism for alternately engaging the piston (3) with the traction member (7). The traction member (7) is a rope sealingly passed through end faces (2, 2') of the housing (1) and through the piston (3) in which there are mounted devices (8) for engaging it with the rope, these devices engage with the rope and disengage from it upon delivery of pressurized fluid medium to one of chambers of the housing (1).

4 Claims, 7 Drawing Figures

POWER HYDRAULIC GEAR

TECHNICAL FIELD

The present invention relates to actuators brought into operation by means of pressurized fluid medium and, more particularly, it relates to power hydraulic gears.

This invention can be used most conveniently for conveying loads through considerable distances under conditions of great forces developed by the actuator. Such gears may find extensive application in the mining industry for developing various hoisting mechanisms, for conveying large-sized loads through great distances under conditions of restricted space.

The invention may also find application in the construction industry for developing power winches and general-purpose transportation means.

PRIOR ART

Currently known in the art are numerous actuators embodying the principle of hydraulic power cylinders used for the conveyance of loads and as driving mechanisms for diverse equipment. the use of most such mechanisms in transportation means designed for conveying heavy loads through considerable distances presents a number of difficulties because of inherent restrictions upon the length of working stroke due to finite length of piston rods, as well as because of the impossibility of developing considerable forces due to the emergence of strong leaks of the working fluid through seals.

There is known in the art a power hydraulic gear (cf., EP Application No. 0057622, Int.Cl. B 66 D 3/02 // F 16 G 11/04) comprising a housing to which are secured two double-acting hydraulic cylinders whose rods are connected with one self-gripping block while the cylinders are connected with another block. A wire passes through the blocks in the axial direction. The blocks are provided with wire-gripping members. The operation of the cylinders in accompanied by alternate gripping of the wire from which a load is suspended. The overall dimensions of such prior art gear, as well as the rate with which said gear will move the load, depends upon the parameters of the hydraulic cylinders and their piston stroke.

The basic performance of such power hydraulic gear depends fully upon the structural arrangement of its hydraulic cylinders. The mass of load being moved and its rate depend upon the rod length and diameter and the rod end volume of the hydraulic cylinder. An increase in the mass of load being moved calls for an increase of the rod diameter which, in its turn, leads to a reduction of its length and increase of the rod end volume, the latter increase resulting in a reduction of the rate of moving the load. Consequently, given such a structural arrangement of power hydraulic gear, the overall dimensions of a corresponding high-power drive would be so bulky as to render its manufacture technically and technologically impossible.

Further known in the art is a power hydraulic gear fashioned as a slide mechanism with a hydraulic drive for lifting and lowering loads (cf., F.R.G. Patent Application No. 1,219,199, NPC 35 d 2/05), comprising a lift cylinder having a piston with a spring and a traction member in the form of a rod, means for engaging said rod in the form of a top gripping head and a bottom gripping head with top and bottom pressure chambers, and a control member. The top gripping head is rigidly coupled with the lift cylinder piston and control member. The bottom gripping head is rigidly coupled with the lift cylinder piston. The lift cylinder piston is made integral with the rod connected by means of a guide to the control member piston. Depending on the position of the control member, there occurs a sumultaneous connection to a pressure source of the top pressure chamber of the bottom gripping head and of the pressure chamber of the lift cylinder. After the lowering of the bottom gripping head, the pressure source starts communicating with the bottom pressure chamber of the bottom gripping head. Immediately thereafter and prior to the completion of the downward stroke of the top gripping head, the top and bottom pressure chambers of the top gripping head communicate with the pressure source with the aid of a delivery pipeline and a discharge pipeline. Thereupon, the cycle is repeated.

Because of a small stroke of the lift cylinder piston, restricted by the return spring parameters, it is impossible to attain an increased rate of movement of the traction member using such a power hydraulic gear.

ESSENCE OF THE INVENTION

The present invention is aimed at solving the problem of developing a power hydraulic gear of the self-propelled type wherein the relative position and structural arrangement of the traction member, piston and means for engaging the piston with the traction member would provide a possibility of increasing the working stroke and rate of movement of the piston under conditions of small overall dimensions of the gear and considerable traction forces.

This invention resides essentially in that, in a power hydraulic gear comprising a hollow cylindrical housing with end faces, which accommodates thereinside a piston dividing the housing space into a direct stroke chamber and a return stroke chamber communicated alternately with a source of pressurized fluid medium for effecting translation movement of the piston along a traction guide member passed therethrough, and means for alternately engaging the piston with the traction guide member, according to the present invention, the traction guide member is a rope sealingly passed through the end faces of the housing and the piston, the latter accommodating means for engaging with the rope, said means adapted to engage with said rope upon delivery of pressurized fluid medium to one of the chambers of the housing and disengage from the rope upon delivery of pressurized fluid medium to the other chamber of the housing.

The use of a rope as the traction guide member enables one to reduce the overall dimensions of the power hydraulic gear, increase the final load and simplify the structure of the engaging means.

It is desirable that the means for engaging the piston with the rope in the herein disclosed power hydraulic gear be fashioned as wedge-shaped members located in a piston recess and arranged circumferentially of the rope, and a pusher in the form of a piston dividing the recess into two spaces of which one is communicated with the direct stroke chamber of the housing and the other one—with the return stroke chamber.

The arrangement of the means for engaging the piston with the rope in the form of wedge-shaped members positioned circumferentially of the rope eliminates intermediate kinematic connections between the piston, hydraulic cylinder and the rope, thereby providing for a compact structure, reduced overall dimensions and increased traction force owing to an increase of the effective working area of the piston with a constant internal diameter of the space of the hydraulic cylinder housing.

It is expedient that seals of the housing end faces and piston in the power hydraulic gear of the invention be fashioned as chambers formed in each end face and piston and filled with a viscoelastoplastic material, said chambers being provided with means for developing in them a pressure exceeding that of the fluid medium.

The use of a viscoelastoplastic material in the seals provides for the operation of the hydraulic cylinders of the power hydraulic gear of the invention under elevated pressures.

It is expedient that the means for engaging the piston with the rope in the power hydraulic gear of this invention be provided with spring members which serve to ensure a permanent urging of the wedge-shaped members against the rope.

The permanent urging of the wedge-shaped members against the rope provides for their reliable and rapid engagement with the latter.

It is desirable that the seal of one of the housing end faces in the herein disclosed power hydraulic gear be provided with the device for arresting the rope relative to the housing upon free (idle) translation movement of the piston on the rope passed therethrough.

The use of an arresting device in one seal provides for a reliable operation of the power hydraulic gear when moving a load over an inclined plane.

It is expedient that the traction rope used in the power hydraulic gear of the invention should be a locked-coil rope whose interwire space is filled over the entire length thereof with a viscoelastoplastic material.

It is beneficial to use a locked-coil rope which has over its entire length a cross-section featuring the minimum interwire space filled with a viscoelastoplastic material because translation movement of the housing relative to the rope is accompanied by interaction with said housing of the viscoelastoplactic material of the seals of the end faces and rope, this leading to the formation of thixotropic bonds and restoration of continuity of structure of the material filling the interwire space of the rope, which results in higher reliability of operation of the power hydraulic gear under elevated pressures.

It is impossible to install in the power hydraulic gear of the present invention, in the space of the housing, an additional piston capable of translation movement relative to the rope sealingly passed therethrough, and to provide said additional piston with means for engaging it with the rope, said means adapted to engage said rope upon delivery of pressurized fluid medium to one of the chambers of the housing and disengage from the rope upon delivery of pressurized fluid medium to the other chamber of the housing. While so doing, it is desirable to provide between the pistons a sealing member including a chamber filled with a viscoelastoplastic material and provided with means for developing thereinside a pressure exceeding that of the fluid medium.

The provision in the housing of the hydraulic cylinder of an additional piston with means for engaging the traction member and of a dividing sealing member between the pistons makes for a higher efficiency and continuous movement of the power hydraulic gear, i.e., eliminates pulsatory movement.

SUMMARY OF THE DRAWINGS

This invention will be better understood upon considering the following detailed description of examplary embodiments thereof with due references to the accompanying drawings in which.

PREFERRED EMBODIMENT OF THE INVENTION

Figure 1:
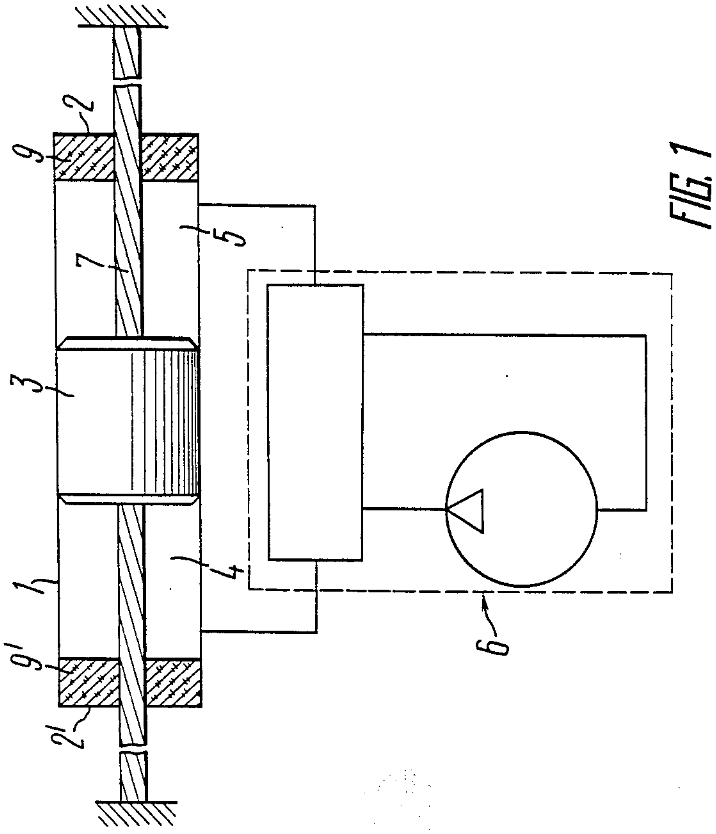
FIG. 1 shows diagrammatically the power hydraulic gear according to the present inveniton, in longitudinal section.

Referring now to the accompanying drawings, the herein disclosed power hydraulic gear of the self-propelled type, whose general view is shown in FIG. 1, comprises a hollow cylindrical housing 1 with end faces 2, 2', a piston 3 placed within the housing 1 and serving to divide the space of the latter into a direct stroke chamber 4 and a return stroke chamber 5. The direct and return stroke chambers 4 and 5 are alternately communicated with a source 6 of pressurized fluid medium for effecting translation movement of the piston 3. Passed through the piston 3 is a traction guide member 7. The piston 3 (FIG. 2) includes means 8 for alternately engaging the traction guide member 7 which is a rope. The traction guide member 7 (rope) is also passed through seals 9, 9' (FIG. 1) provided in the end faces 2, 2' of the hollow housing 1 and through a seal of the piston 3. The piston 3 (FIG. 2) further comprises, arranged in a recess thereof, means 8 for engaging the traction guide member 7 and its seal 9''. The engaging means 8 are fashioned as wedge-shaped members 10 mounted in the ports of a mandrel 11 located in a tapered recess in the piston 3 with a possibility of axial bias, and a pusher 12 in the form of a piston. The mandrel 11 is provided with spring members 13 designed to permanently urge the wedge-shaped members 10 against the rope 7. The spring members 13 are mounted on the surface of the cylindrical portion of the mandrel 11 between its bearing flange 14 and end face of the piston 3. The pusher 12 divides the recess of the piston 3 into two spaces 15 and 16. The space 15 is communicated with the direct stroke chamber 4 via circular clearance 17 formed between the external surface of the traction guide member 7 and the internal surface of the mandrel 11. The space 16 is communicated with the return stroke chamber 5 via channel 18. The seal 9'' of the piston 3 relative to the traction guide member 7 is made analogous with the seals of the end faces 2, 2' of the housing 1. The seal 9 includes a chamber 19 (FIG. 3) which is filled with a viscoelastoplastic material and confined between a sleeve 20 made of an antifriction material and means for developing pressure in the chamber 19, said means fashioned as a piston 21. The piston 3 has a space 22 (FIG. 2) communicated via channel 23 with the return stroke chamber 5 of the housing. The space 22 accommodates a piston 12′ designed to develop pressure acting upon the seal 9″.

Figure 2:
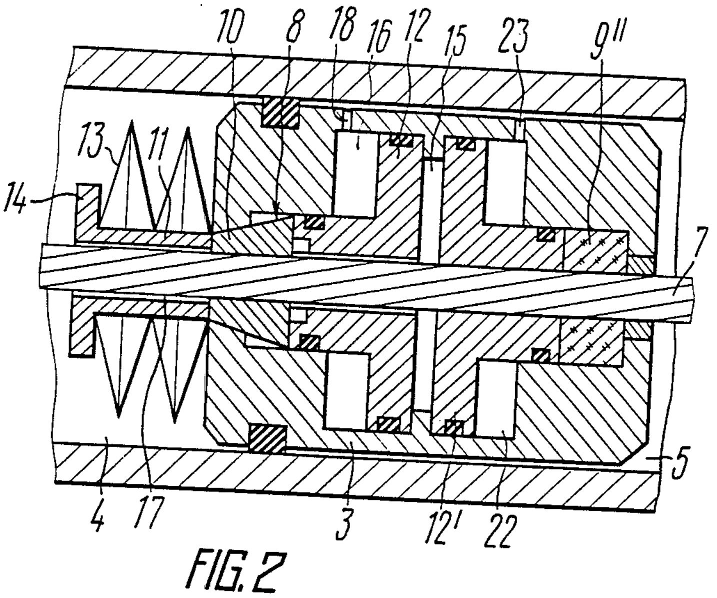
FIG. 2 is a general view of the piston, in longitudinal section.
Figure 3:
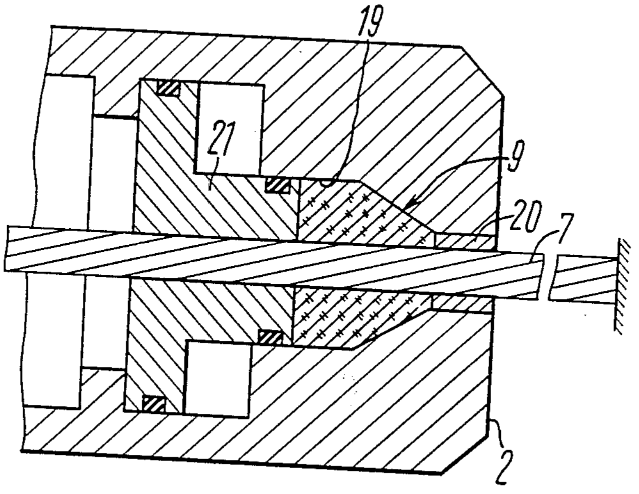
FIG. 3 is a sectional view of the seal of an end face of the housing.

Fluid medium from the pressure source 6 is delivered to the direct stroke chamber 4 (FIG. 1). In so doing, a pressure is developed acting upon the piston 3 in the direction of gripping of the wedge-shaped members 10 (FIG. 2) pre-gripped around the traction member 7 with the aid of the mandrel 11 and spring members 13, whereas additional gripping of the wedge-shaped members 10 is provided via pusher 12 in the space 15 whereby a reliable engagement of the piston 3 with the traction member 7 is effected. The fluid medium pressure further affects the piston 21 (FIG. 3) which develops a pressure against the viscoelastoplastic material in the chamber 19 to provide for reliable sealing of the traction guide member 7. With the traction guide member 7 securely fixed, there occurs the engagement therewith of the piston 3 (FIG. 2) and displacement of the housing 1 connected to the load (as seen in FIG. 2, to the extreme left-hand position). When the fluid medium is delivered to the return stroke chamber 5, it gets to the space 16 via channel 18 and develops a pressure upon the pusher 12 which moves to the right to release the wedge-shaped members 10 and keep them disengaged from the traction guide member 7. The piston 3 moves to the extreme left-hand position. In addition, when the fluid medium is delivered to the return stroke chamber 5, it gets via channel 23 to the space 22 and forces back the piston 12′, which results in a reduction of pressure upon the seal 9″ during the idle stroke of the piston 3. In this manner, pulsatory movement of the power hydraulic gear is performed. Such movement may take place in a horizontal plane and in an inclined plane with small angles, when the force of friction between the power hydraulic gear and the surface over which it moves is greater than the force required to disengage the piston 3 from the rope 7. The path of movement of the power hydraulic gear depends on the length of the traction guide member 7.

With the housing 1 securely fixed and a load applied to the left-hand (as shown in FIG. 1) side of the rope 7 and tension to its right-hand side the force of tensioning which would exceed the force of rope friction in the seal 9 of the right-hand end face 2 of the housing 1 and the force required for disengaging the piston 3, the delivery of fluid medium to the direct stroke chamber 4 will cause the piston 3 to engage with the rope 7 and move together with the latter to the extreme right-hand position. Upon the delivery of fluid medium to the return stroke chamber 5, the piston 3 will disengage from the rope 7 and move to the extreme left-hand position in the idle stroke mode.

The use of a rope as the traction member in the herein described power hydraulic gear and the piston embodiment allowing for alternate engagement with and disengagement from the rope enables one to make the power hydraulic gear more compact and attain greater traction forces while maintaining the same overall dimensions of the hydraulic cylinder.

Figure 4:
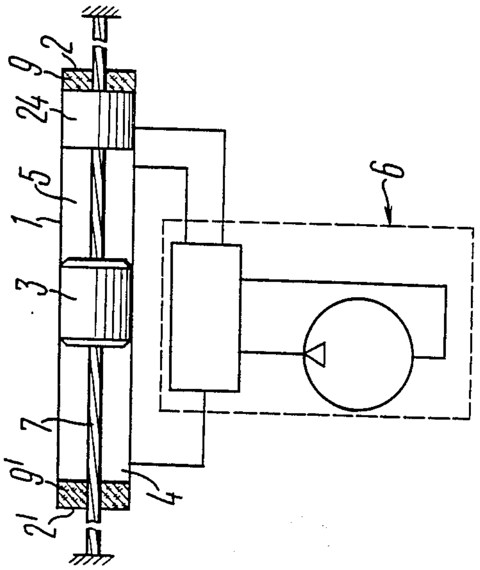
FIG. 4 shows an embodiment of the power hydraulic gear of the invention incorporating an arresting device.

Now, the power hydraulic gear whose improved embodiment is shown in FIG. 4 comprises a hollow housing 1 with end faces 2 and 2′, ad a piston 3 which divides the space of the housing 1 into a direct stroke chamber 4 and a return stroke chamber 5. The direct and return stroke chambers 4 and 5 are alternately communicated with a source 6 of fluid medium pressure. The left-hand end face 2′ of the housing accommodates a seal 9′ while a seal 9 in the right-hand end face is made integral with an arresting device 24. A traction guide member 7 is passed through the seals of the housing end faces, piston 3 and arresting device 24.

Upon delivery of pressurized fluid medium to the return stroke chamber 5 (FIG. 4), the piston 3 disengages from the traction member 7, the arresting device 24 locks the traction member relative to the housing 1, and the piston 3 moves in the idle stroke mode to the initial, say, extreme left-hand (as shown in FIG. 4) positions. Upon delivery of pressurized fluid medium to the direct stroke chamber 4, the piston 3 engages with the traction guide member 7 which is unlocked from the housing 1, and the latter moves to the extreme left-hand position.

Figure 5:
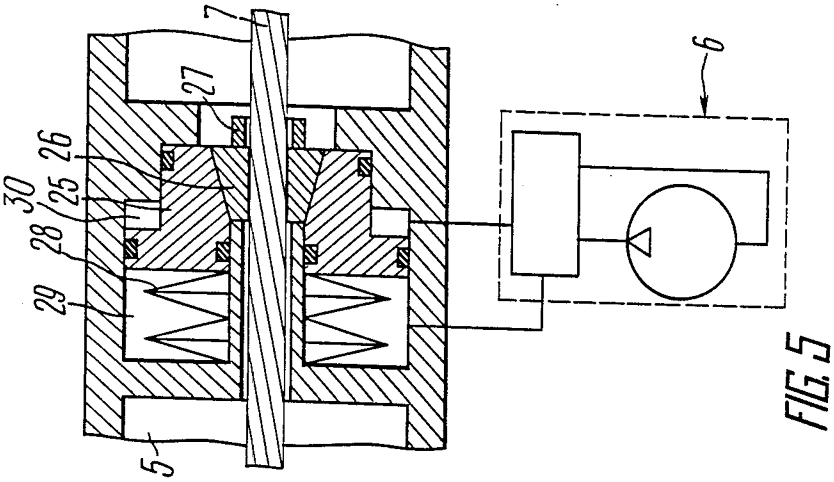
FIG. 5 illustrates the arresting device.

The arresting device includes a piston 25 (FIG. 5), wedge-shaped members 26 arranged circumferentially of the traction guide member in a mandrel 27, spring members 28 and spaces 29 and 30 which are alternately communicated with the fluid medium pressure source 6. The source 29 is communicated with the return stroke chamber 5. When pressurized fluid medium is delivered to the return stroke chamber 5 (FIG. 4), is it also supplied to the space 29 (FIG. 5) of the arresting device to move the piston 25 in the right-hand direction, said piston acting to lock the traction guide member 7 by means of the wedge-shaped members 26 arranged in the mandrel 27. Upon delivery of fluid medium to the space 30, the piston 25 moves to the left to release the wedge-shaped members 26 thereby releasing the traction guide member 7.

The use of an arresting device in the housing of the power hydraulic gear cylinder provides for its reliable operation when moving loads over inclined and vertical planes.

Figure 6:
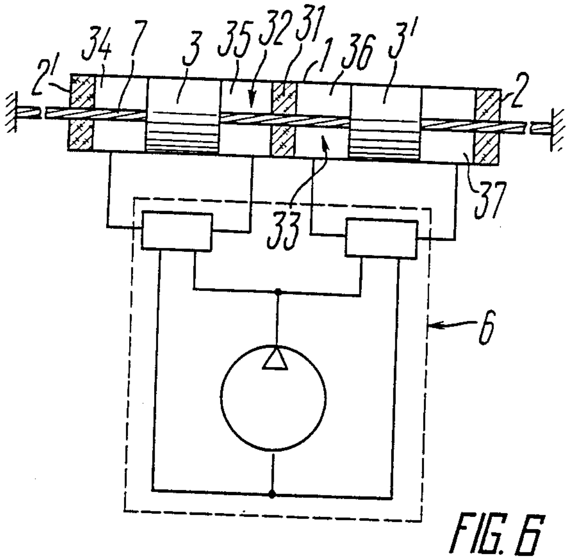
FIG. 6 shows an embodiment of the power hydraulic gear of the invention incorporating two pistons and a seal therebetween.

The power hydraulic gear shown diagrammatically in FIG. 6 comprises a housing 1 with end faces 2, 2′, a piston 3, a piston 3′ and a sealing member 31 between the pistons 3 and 3′. The sealing member 31 divides the housing 1 into two spaces 32 and 33. The piston 3 divides the space 32 into two chambers, namely, a direct stroke chamber 34 and a return stroke chamber 35. The piston 3′ divides the space 33 into a direct stroke chamber 36 and a return stroke chamber 37. The direct and return stroke chambers 34, 36 and 35, 37 are communicated with a source 6 of fluid medium pressure. Provided in the end faces 2, 2′ of the housing 1 and pistons 3 and 3′ are cooling members through which, as well as through the sealing member 31, a traction guide member 7 is passed.

Such an embodiment operates as follows.

Upon delivery of fluid medium to the direct stroke chamber 34 and return stroke chamber 37, the piston 3 engages with the traction member 7 while the piston 3′ disengages from said member. The housing 1 starts performing translation movement in the left-hand direction, with the piston 3′ also performing translation movement in the left-hand direction in the idle stroke mode. Upon delivery of fluid medium to the return stroke chamber 35 of the piston 3 and direct stroke chamber 36 of the piston 3′, the piston 3′ engages with the traction member 7 and the housing 1 continues to perform translation movement in the same direction while the piston 3 disengages from the traction member 7 and performs translation movement in the left-hand direction in the idle stroke mode. Upon delivery of fluid medium to the direct stroke chamber 34 of the piston 3 and return stroke chamber 37 of the piston 3′, the cycle is repeated.

The use in the hydraulic cylinder of two pistons and a sealing member therebetween provides for a higher efficiency of the power hydraulic gear and for the continuity of its movement in the preset direction.

Figure 7:
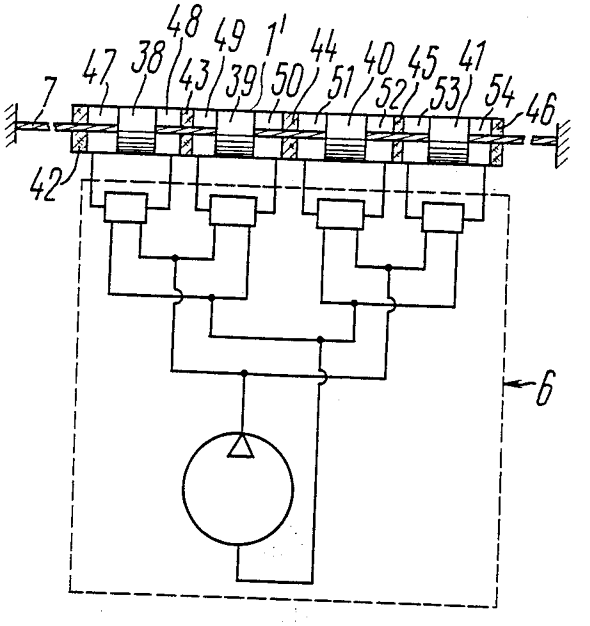
FIG. 7 illustrating an embodiment of a reversing power hydraulic gear.

A reversing power hydraulic gear whose embodiment is diagrammatically shown in FIG. 7 comprises a cylindrical housing 1', accommodating in its space pistons 38, 39, 40, 41. The pistons 38, 39, 40, 41 are provided with sealing members for a traction guide member 7 and with means for alternately engaging said traction member. Mounted between the pistons and in the end faces of the housing 1' are analogous sealing members 42, 43, 44, 45, 46. By their means for engaging the traction guide member 7, the pistons 40 and 41 are arranged oppositely with the pistons 38, 39. Each piston between two sealing members forms direct stroke chambers 47, 49, 52, 54 and return stroke chambers 48, 50, 51 and 53, said chambers being alternately communicated with a fluid medium pressure source 6.

This latter gear operates in the following manner.

Upon delivery of fluid medium to the direct stroke chamber 47 and return stroke chambers 50, 51 and 53, the piston 38 engages with the traction guide member 7 while the pistons 39, 40 and 41 disengage from said traction member. The housing 1' starts performing translation movement in the left-hand direction while the piston 39 also moves in the left-hand direction in the idle stroke mode and the pistons 40 and 41—in the right-hand direction.

Upon delivery of pressurized fluid medium to the return stroke chamber 48 of the piston 38, to the direct stroke chamber 49 of the piston 39 and to the return stroke chambers 51 and 53 of the pistons 40 and 41, the piston 39 engages with the traction guide member 7 and the housing 1' will continue its translation movement in the same left-hand direction while the piston 38 disengages from the traction guide member 7 and performs translation movement in the left-hand direction in the idle stroke mode, the pistons 40 and 41 being in the extreme right-hand position and disengaged during the entire period of the leftward movement of the housing 1'. Upon reverse delivery of pressurized fluid medium to the direct stroke chamber 47 of the piston 38 and to the return stroke chamber 50 of the piston 39, the cycle is repeated and the housing 1' performs continuous movement in the left-hand direction only.

For reversing the movement of the housing 1', pressurized fluid medium must be delivered to the direct stroke chamber 52 of the piston 40 and to the return stroke chambers 48, 50 and 53 of the pistons 38, 39 and 41. The piston 40 will engage with the traction guide member 7, the piston 41 will not change its position, i.e., it will stay in the extreme right-hand position and disengaged from the traction member 7, the housing 1' will start performing translation movement in the right-hand direction, and the pistons 38 and 39 will disengage from the guide member 7 and move to the extreme left-hand position. Upon change in the direction of delivery of pressurized fluid medium relative to the pistons 40 and 41, with the pistons 38 and 39 staying in the same position, the piston 40 will disengage from the traction guide memmber 7 and move in the right-hand direction in the idle stroke mode, the piston 41 will engage with the traction member 7, and the housing 1' will continue its rightward movement.

The use in the hydraulic cylinder housing of four pistons and dividing seals therebetween provides for continuous movement of the power hydraulic gear in two opposite directions, i.e., provides for reciprocating movement of the gear, the path of said movement depending on the length of the traction guide member.

INDUSTRIAL APPLICABILITY

The present invention can be used most advantageously in the mining industry as the actuator of mining machines involving conveyance of loads through considerable distances applying great forces. The herein disclosed power hydraulic gear can find extensive application in feed systems of mechanisms such as miners, plough units, frontal units, as well as in feed systems of drilling rig actuators, in underground transport drives. In construction, the power hydraulic gear of this invention can be conveniently used in gantry, travelling, tower and other cranes as a drive for hoisting the load and for moving the crane itself and the load carriage, as well as in digging machines such as excavators and draglines featuring a large boom and high load capacity of the bucket.

What is claimed is:

1. A power hydraulic gear comprising a hollow cylindrical housing (1) with end faces (2, 2'), said housing accommodating thereinside a piston (3) dividing the housing space into a direct stroke chamber (4) and a return stroke chamber (5) communicated alternately with a source (6) of pressurized fluid medium for effecting efficient translation movement of the piston along a traction guide member (7) passed therethrough, and means (8) for engaging the piston (3) with the traction guide member (7), characterized in that the traction guide member (7) is a rope passed through seals (9, 9') fitted at the end faces (2, 2') of the housing (1) and through the piston (3) which accommodates the means (8) for engaging with the rope, said means adapted to engage said rope upon delivery of pressurized fluid medium to one of the chambers of the housing and disengage from the rope upon delivery of pressurized fluid medium to the other one of the housing chambers, characterized in that the seals (9, 9', 9") of the housing end faces and of the piston (3) are fashioned as chambers formed in each end face (2, 2') and in the piston (3) and filled with a viscoelastoplastic material, said chambers being provided with means for developing in them a pressure, said means being fashioned as step-like pistons (21, 21', 12) fitted in the chambers formed in the end faces (2, 2') and piston (3) and communicating with said direct and return stroke chambers.

2. A power hydraulic gear as set forth in claim 1, characterized in that the traction guide member (7) is a locked-coil rope whose interwire space is filled over its entire length with a viscoelastoplastic material.

3. A power hydraulic gear comprising a hollow cylindrical housing 91) with end faces (2, 2'), said housing accommodating thereinside a piston (3) dividing the housing space into a direct stroke chamber (4) and a return stroke chamber (5) communicated alternately with a source (6) of pressurized fluid medium for effecting translation movement of the piston along a traction guide member (7) passed therethrough, and means (8) for engaging the piston (3) with the traction guide member (7), characterized in that the traction guide member (7) is a rope passed through seals (9, 9') fitted at the end faces (2, 2') of the housing (1) and through the piston (3) which accommodates the means (8) for engaging with the rope, said means adapted to engage said rope upon delivery of pressurized fluid medium to one of the chambers of the housing and disengage from the rope upon delivery of pressurized fluid medium to the other one of the housing chambers, the means (8) for engaging the piston (3) with the rope (7) being fashioned as wedge-shaped members (10) located in a piston recess and arranged circumferentially of the rope, and a pusher (12) in the form of a piston dividing the recess into two spaces (15, 16) of which one is communicated with the direct stroke chamber (4) of the housing and the other one is communicated with the return stroke chamber (5) of the housing (1).

4. A power hydraulic gear comprising a hollow cylindrical housing (1) with end faces (2, 2'), said housing accommodating thereinside a piston (3) dividing the housing space into a direct stroke chamber (4) and a return stroke chamber (5) communicated alternately with a source (6) of pressurized fluid medium for effecting translation movement of the piston along a traction guide member (7) passed therethrough, and means (8) for engaging the piston (3) with the traction guide member (7), characterized in that the traction guide member (7) is a rope passed through seals (9, 9') fitted at the end faces (2, 2') of the housing (1) and through the piston (3) which accommodates the means (8) for engaging with the rope, said means adapted to engage said rope upon delivery of pressurized fluid medium to one of the chambers of the housing and disengage from the rope upon delivery of pressurized fluid medium to the other one of the housing chambers, the traction guide member (7) being a locked-coil rope whose interwire space is filled over its entire length with a viscoelastoplastic material.

* * * * *